May 16, 1967 E. J. STENGLE, JR 3,319,540
METHOD OF FORMING BAG OF HEAT-SEALABLE MATERIAL
AND BAG FORMED THEREBY
Filed Nov. 5, 1964
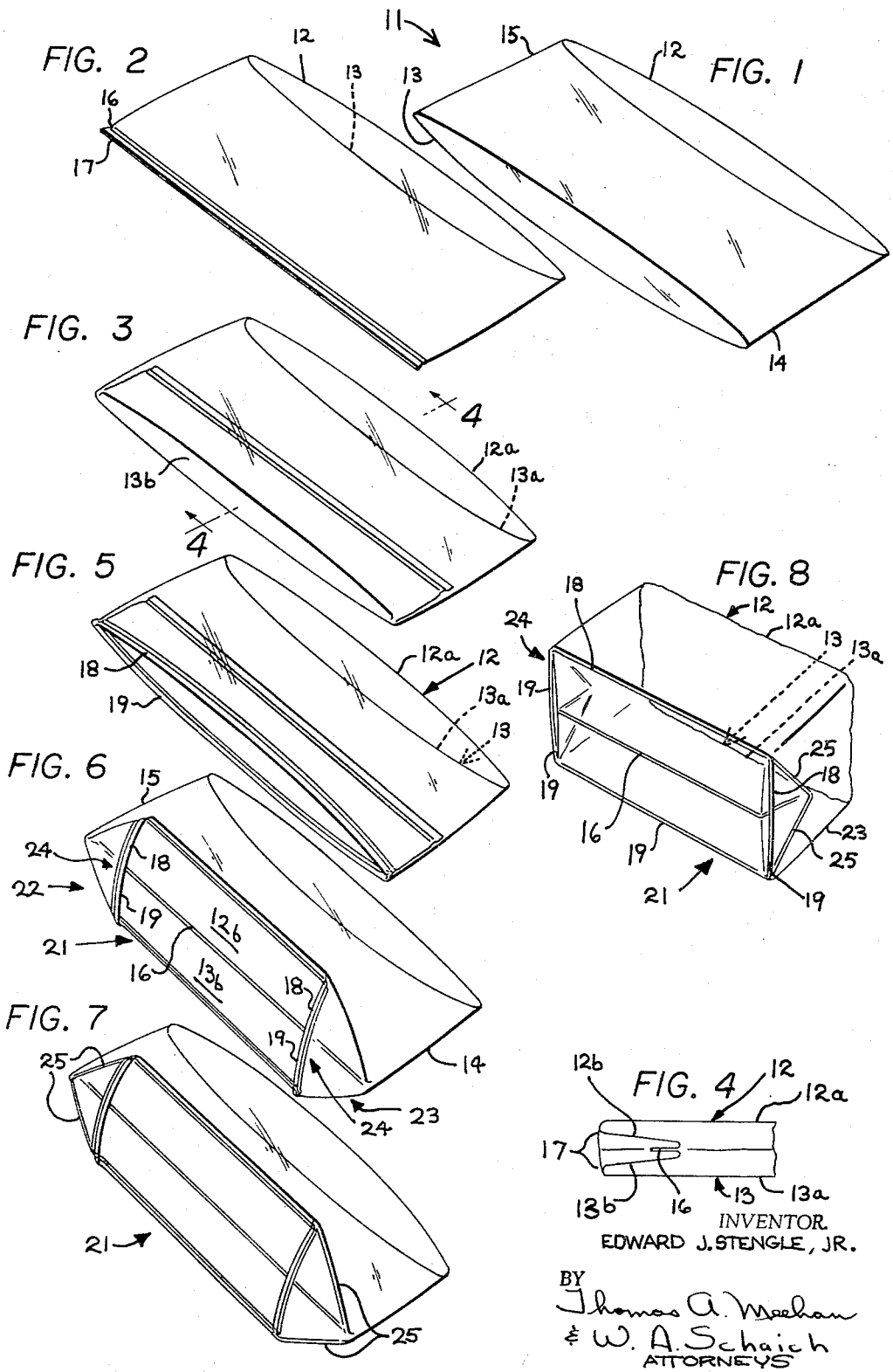
INVENTOR.
EDWARD J. STENGLE, JR.
BY
Thomas A. Meehan
& W. A. Schaich
ATTORNEYS

United States Patent Office 3,319,540
Patented May 16, 1967

3,319,540
METHOD OF FORMING BAG OF HEAT-SEALABLE MATERIAL AND BAG FORMED THEREBY
Edward J. Stengle, Jr., Toledo, Ohio, assignor to Owens-Illinois, Inc., a corporation of Ohio
Filed Nov. 5, 1964, Ser. No. 409,227
7 Claims. (Cl. 93—35)

This invention relates to a method of forming a bag of a heat-sealable material such as a thermoplastic material, and particularly polyethylene, and to the bag formed thereby. This invention relates more particularly to a method of forming such a bag wherein the bag is of the type which is commonly designated a "satchel bottom" bag, and to the bag formed thereby. More particularly, this invention relates to a method of forming a satchel bottom plastic bag by external heat sealing steps from a flattened seamless tube of extruded thermoplastic material, and to the bag formed thereby.

In the utilization of bags formed of thermoplastic materials it is desirable that the bags incorporate a rectangularly shaped or "satchel" bottom so that they can stand on end to conserve storage space and to be capable of being handled more easily along a filling line. A number of methods of forming a bag with such a bottom and the bags formed thereby are known in the art but have not been entirely satisfactory. In connection with the methods of forming, such methods have normally been quite complicated, and therefore expensive, frequently involving the advancement of a mandril into the interior of the bag from the open end thereof to back up or support portions of the bag being heat sealed, a step which is time consuming and complicated and which, therefore, greatly complicates the machinery required to produce bags according to such a method at acceptable rates of production. Furthermore, in connection with the bags produced by many of the known methods, they frequently are not adequately reinforced at points of maximum stress and are, therefore, subject to premature and/or unduly high rates of failure.

Accordingly it is an object of the present invention, to provide a simplified method of forming a bag of heat sealable material and to provide a bag of improved characteristics produced in accordance with such a method. For a further understanding of the invention, attention is directed to the following portion of the specification, the drawing, and the appended claims.

In the drawing:
FIG. 1 is a perspective view of a flattened length of seamless thermoplastic tubing from which a bag in accordance with the present invention is produced in accordance with the method of the present invention;
FIGS. 2 and 3 are perspective views showing successive steps in the method of the present invention in producing a bag in accordance with the present invention from the flattened length of the tubing shown in FIG. 1;
FIG. 4 is a sectional view taken on line 4—4 of FIG. 3;
FIGS. 5 through 7 are perspective views showing further successive steps in the method of the present invention in producing a bag in accordance with the present invention;
FIG. 8 is a perspective view showing a bag in accordance with the present invention that has been produced by the method of the present invention.

Turning now to FIGURE 1, there is illustrated there a flattened length of seamless thermoplastic tubing 11, commonly called lay-flat tubing, which may be produced, for example, by any of the several widely used thermoplastic tubing extrusion processes. Tubing length 11 comprises, therefore, first and second rectangular plies 12 and 13 of thermoplastic material disposed in parallel relationship to one another and foldably joined to one another along a pair of parallel edges 14 and 15. It is obvious, of course, that it is within the contemplation of this invention that a structure produced by heat sealing initially separate rectangular sheets of thermoplastic material along a pair of parallel edges would be an equivalent of flattened length of seamless thermoplastic tubing 11.

The step in the manufacture of the bag of FIGURE 8 following the step of providing a flattened length of seamless thermoplastic tubing 11, or an equivalent thereof, comprises joining plies 12 and 13 of thermoplastic material together by heat sealing in a linear pattern along line 16 extending between edges 14 and 15 and adjacent a third edge 17 of each of plies 12 and 13. Subsequent to the step of joining plies 12 and 13 of thermoplastic material to one another along line 16 adjacent third edges 17, edges 17 are advanced toward the unjoined edges of the plies interiorly of the plies to form an item that is shaped generally like a W in transverse section, as is shown more particularly in FIGURES 3 and 4. At this stage in the manufacture of the bag of FIGURE 8, ply 12 of thermoplastic material comprises a first major portion 12a and a second minor portion 12b foldably joined thereto and ply 13 comprises a first major portion 13a and a second minor portion 13b foldably joined thereto. Subsequent to this step in the method, portions 12a and 12b of ply 12 and portions 13a and 13b of ply 13 are further joined to one another by heat sealing in linear patterns along lines 18 and 19, respectively, extending transversely across plies 12 and 13 and closely adjacent to the lines of fold between portions 12a and 12b and portions 13a and 13b, respectively. Thereafter, the V-shaped portion of ply 12 comprising portion 12b and that part of the portion of 12a which overlies portion 12b and the V-shaped portion of ply 13 comprising portion 13b and that part of the portion of ply 13a which overlies portion 12b are spread from one another to such an extent that the heat seals along lines 18 and 19 are generally coplanar with one another and with the heat seal along line 16 thereby forming a surface 21 comprising the medial sub-portions of portions 12b and 13b of plies 12 and 13, and further forming triangular flaps 22 and 23 extending inwardly from the edges 14 and 15 of plies 12 and 13 and overlying the edge sub-portions of portions 12b and 13b thereof. It is noted that each of triangular flaps 22 and 23 thereby incorporate a heat seal along a line adjacent its base comprising an end portion of each of the heat seals along lines 18 and 19, such lines of heat seal in each of triangular flaps 22 and 23 being designated generally by numeral 24. It is further noted that the heat seals along lines 24 of triangular flaps 22 and 23 are disposed toward one another and are generally parallel to one another.

Subsequently, each of triangular flaps 22 and 23 is attached to the underlying sub-portions of portions 12b and 13b of plies 12 and 13 by heat sealing in an angular pattern along line 25 which is disposed interiorly of and closely adjacent the other edges of triangular flaps 22 and 23. FIGURE 7 depicts a bag made in accordance with this invention after this step has been completed. Bags in this state of manufacture may be shipped flat and are readily opened for use in the manner shown in FIGURE 8 simply by separating portions 12a and 13a of plies 12 and 13 from one another. When opened in this manner, triangular flaps 23 and 24 will extend generally normally from surface 21, which, in turn, constitutes a rectangularly shaped or "satchel" bottom for the bag of this invention. One of the foremost characteristics of such a bag lies in the fact that there is provided a continuous line of heat seal between the material in the rectangular bottom and the material in each of the four side walls extending therefrom. The continuity of the line of heat seal circumscribing the rectangularly shaped bottom is of advantage in giving the bag a more positive or more well defined identity and in structurally reinforcing the bag against tearing in a region where the tendency for the contents of the bag to impose unusually severe tensile stresses is most likely.

It will, of course, be understood that various details of construction may be modified through a wide range without departing from the principles of this invention, and it is not, therefore, the purpose of the foregoing description to limit the patent granted hereon otherwise than is necessary by the scope of the appended claims.

I claim:

1. In the method of forming a bag of heat sealable material, the steps of: providing a pair of plies of heat sealable material that are joined to one another along three edges two of which are parallel to one another and the third of which extends normally to the other two between loci adjacent the extremities thereof; advancing the third joined edge of each of the plies partially to the unjoined edges of the plies interiorly of the plies to form an item that is shaped like a W in transverse section; heat sealing each of the sides of each of the U-shaped portions of the W-shaped item to the other side of the same U in a linear pattern extending thereacross, parallel to the unjoined edges of the sheets and adjacent the apex of the U; spreading each of the U's of the W-shaped item toward the unjoined edges of the plies to form a surface comprising the interior side of each of the U-shaped portions and a pair of triangular flaps each of which extends inwardly from one of the opposing edges of the plies normal to the unjoined edges thereof, the base portions of each of the triangular flaps being disposed toward one another and being generally parallel to one another; and permanently securing the triangular flaps to the underlying portions of the surface by heat sealing in a linear pattern along the two sides of each triangle extending from an edge of the opposing edges of the plies normal to the unjoined edges.

2. The method according to claim 1 and, further comprising folding each of the triangular flaps and the underlying portions secured thereto toward the unjoined edges of the plies along a line extending parallel to the base of the respective triangular flaps and disposed proximate thereto; and separating the portions of the plies extending away from said surface from one another.

3. Method of forming a bag of heat sealable material comprising the steps of: providing a length of flattened seamless tubing of heat sealable material comprising a pair of plies of said material foldably joined to one another along parallel edges; heat sealing said plies to one another in a lineal pattern along a first line extending between loci adjacent the extremities of said parallel edges and normally thereto; advancing the portions of the plies so heat sealed normally to the line of heat seal between the remaining portions of the plies partially toward the other extremities of said parallel edges thereby forming a first U-shaped item defined by portions of the first ply and a second U-shaped item defined by portions of the second ply; heat sealing said portions of the first ply to one another in a lineal pattern along a second line extending across the first U-shaped item and adjacent the apex thereof; heat sealing said portions of the second ply to one another in a lineal pattern along a third line extending across the second U-shaped item and adjacent the edges thereof; spreading the U-shaped items from one another to bring substantial portions of said first, second, and third lines into co-planar relationship with one another and to define a surface having a triangular flap overlying each of the edge portions thereof with the bases of the triangular flaps being disposed toward one another and parallel to one another; and heat sealing each of said triangular flaps to the underlying portion of said surface.

4. The method of claim 3 wherein each of said triangular flaps is heat sealed to the underlying portion of said surface in an angular pattern extending in a line adjacent the sides of the triangle other than the base.

5. The method of claim 3 and further comprising, folding each of the triangular flaps and the respective underlying portions of the surface secured thereto to extend generally vertically from the remaining portions of the surface toward the other extremities of the edges of plies, and separating the portions of the plies adjacent said other extremities from one another to form an opened bag with a rectangular bottom.

6. In the formation of a bag of heat sealable material, the method of manufacturing an article from which such a bag may be formed comprising the steps of: providing a length of flattened seamless tubing of heat sealable material comprising a pair of plies of said material foldably joined to one another along parallel edges; heat sealing said plies to one another in a lineal pattern along a first line extending between loci adjacent the extremities of said parallel edges and normally thereto; advancing the portions of the plies so heat sealed normally to the line of heat seal between the remaining portions of the plies partially to the other extremities of said parallel edges thereby forming a first U-shaped item defined by portions of the first ply and a second U-shaped item defined by portions of the second ply; heat sealing said portions of the first ply to one another in a lineal pattern along a second line extending across the first U-shaped item and adjacent the apex thereof; and heat sealing said portions of the second ply to one another in a lineal pattern along a third line extending across the second U-shaped item and adjacent the apex thereof.

7. In the formation of a bag of heat sealable material, the method of manufacturing an article from which such a bag may be formed comprising in sequence, the steps of: providing a pair of plies of heat sealable material that are joined to one another along three edges two of which are parallel to one another and the third of which extends normally to the other two between loci adjacent the extremities thereof; advancing the third joined edge of each of the plies partially to the unjoined edges of the plies interiorly of the plies to form an item that is shaped like a W in transverse section; and heat sealing each of the sides of each of the U-shaped portions of the W-shaped item to the other side of the same U-shaped portion in a linear pattern extending thereacross, parallel to the unjoined edges of the sheets and adjacent the apex of the respective U-shaped portion.

References Cited by the Examiner

UNITED STATES PATENTS

| 439,849 | 11/1890 | Taylor et al. | |
| 711,369 | 10/1902 | West | 93—22 |
| 2,771,010 | 11/1956 | Piazze | 93—35 |
| 3,150,573 | 9/1964 | Piazze | 93—35 |

BERNARD STICKNEY, *Primary Examiner.*